(12) United States Patent
Chouljian

(10) Patent No.: US 11,358,822 B2
(45) Date of Patent: Jun. 14, 2022

(54) PAD OF DISPENSABLE TAPE SEGMENTS

(71) Applicant: Parsig Chouljian, Glendale, CA (US)

(72) Inventor: Parsig Chouljian, Glendale, CA (US)

( * ) Notice: Subject to any disclaimer, the term of this patent is extended or adjusted under 35 U.S.C. 154(b) by 217 days.

(21) Appl. No.: 16/710,397

(22) Filed: Dec. 11, 2019

(65) Prior Publication Data

US 2021/0179382 A1 Jun. 17, 2021

(51) Int. Cl.
| | | |
|---|---|---|
| B65H 35/00 | (2006.01) | |
| B32B 27/08 | (2006.01) | |
| B32B 23/02 | (2006.01) | |
| B32B 27/12 | (2006.01) | |
| B32B 37/12 | (2006.01) | |
| B32B 37/00 | (2006.01) | |
| B32B 37/18 | (2006.01) | |
| B32B 7/06 | (2019.01) | |
| B32B 23/08 | (2006.01) | |

(52) U.S. Cl.
CPC ............ B65H 35/0026 (2013.01); B32B 7/06 (2013.01); B32B 23/02 (2013.01); B32B 23/08 (2013.01); B32B 27/08 (2013.01); B32B 27/12 (2013.01); B32B 37/0076 (2013.01); B32B 37/1292 (2013.01); B32B 37/182 (2013.01)

(58) Field of Classification Search
CPC ............ B65H 35/0026; B65H 2402/41; B65H 2402/443; B32B 7/06; B32B 7/05; B32B 23/02; B32B 23/08; B32B 27/06; B32B 27/08; B32B 27/12; B32B 37/0076; B32B 37/1292; B32B 37/182
USPC ... 156/60, 66, 182, 247, 249, 292, 297, 299, 156/300, 701, 714, 718, 719; 428/34.1, 428/34.2, 34.3, 35.2, 40.1, 41.7, 71.8, 428/42.2, 42.3, 68, 76, 77, 78, 98, 121, 428/124, 126, 127, 128, 129, 192, 221, 428/343, 352, 354, 355 RA
See application file for complete search history.

(56) References Cited

U.S. PATENT DOCUMENTS

| | | | |
|---|---|---|---|
| 6,544,640 B1 * | 4/2003 | Miles ..................... | B65H 33/00 206/820 |
| 2003/0039786 A1 * | 2/2003 | Milliorn .................... | G09F 3/10 428/40.1 |
| 2003/0082327 A1 * | 5/2003 | Pearson .................... | G09F 3/10 156/289 |
| 2005/0129893 A1 * | 6/2005 | Croll ....................... | B32B 15/12 428/40.1 |

(Continued)

*Primary Examiner* — Philip C Tucker
*Assistant Examiner* — Brian R Slawski
(74) *Attorney, Agent, or Firm* — James A. Italia; Italia IP

(57) ABSTRACT

A pad of dispensable adhesive tape segments is shown and described. The pad includes a protective envelope and a number of tape segments. The tape segments are arrayed such that detachable pull tabs for each are exposed for grasp. The envelope may include a strip folded over onto itself and adhered in place. The envelope is pulled open and may be adhered to an environmental surface. Tape segments have adhesive of weaker adherence than the adhesive of the envelope so that when pulled by a pull tab, each tape segment preferentially releases from the next, but the envelope maintains adherence to the environmental surface. Adhesive lined tabs initially holding the envelope closed may also be used for adherence to the environmental surface. Preferably used for medical tape, the envelope is waterproof to maintain sterility of tape segments.

13 Claims, 3 Drawing Sheets

(56) References Cited

U.S. PATENT DOCUMENTS

| | | | | |
|---|---|---|---|---|
| 2008/0092457 A1* | 4/2008 | Malone | ............... | B32B 37/0076 |
| | | | | 52/309.3 |
| 2009/0075006 A1* | 3/2009 | Lynam | .................... | B32B 27/36 |
| | | | | 428/354 |
| 2011/0259775 A1* | 10/2011 | Bratter | .................. | G09F 3/0288 |
| | | | | 156/247 |
| 2015/0021222 A1* | 1/2015 | Di Grigoli | ........ | A61F 13/00072 |
| | | | | 206/440 |
| 2017/0361638 A1* | 12/2017 | Seth | .......................... | B32B 7/12 |

* cited by examiner

PAD OF DISPENSABLE TAPE SEGMENTS

FIELD OF THE INVENTION

The present invention relates to an assembly for dispensing precut pieces of adhesive tape.

BACKGROUND OF THE INVENTION

Medical personnel must frequently install tubular conduits such as catheters, hypodermic needles, and supply tubing such as oxygen and saline solution on the body of a patient. Typically, this is done with medical adhesive tape provided in rolls. This is an awkward situations, as the demands on medical personnel may include accuracy of placement, holding the conduits stably on the body, and cutting the roll of adhesive tape, with many if not all of these needing to be performed simultaneously. The competing demands may impair ability of the medical personnel to perform required tasks accurately and expeditiously. Also, medical adhesive tape is typically provided in continuous rolls from which individual tape segments must be cut. Because of possible contamination, unused medical adhesive tape, now exposed to the atmosphere, is typically discarded after each usage.

There exists a need for a product which will reduce the number of manual operations and time required in applying tubular conduits and other medical apparatus on patients.

There exists a need for a product which will reduce waste of medical adhesive tape.

SUMMARY OF THE INVENTION

The present invention addresses the above stated needs by providing discrete sections of adhesive tape in a form readily manually retrieved, thereby reducing both demand for use of hands and also time of installations.

To these ends, the present invention provides a kit enclosing a predetermined number of discrete, pre-cut sections of adhesive tape in a compact, lightweight kit readily mountable on an environmental surface. The kit is configured to preserve sterility of the tape. The kit enables single handed use thereof.

The kit comprises a protective envelope containing a number of pre-cut, separate strips of medical adhesive tape. The tape segments are arrayed such that detachable pull tabs for each are exposed for grasp. The envelope may comprise a rectangular strip folded over onto itself and adhered in place. The envelope is pulled open and may be adhered to an environmental surface. Tape segments have adhesive of weaker adherence than the adhesive of the envelope so that when pulled by a pull tab, each tape segment preferentially releases from the next, but the envelope maintains adherence to the environmental surface. Adhesive lined tabs initially holding the envelope closed may also be used for adherence to the environmental surface. Preferably used for medical tape, the envelope is waterproof to maintain sterility of tape segments.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
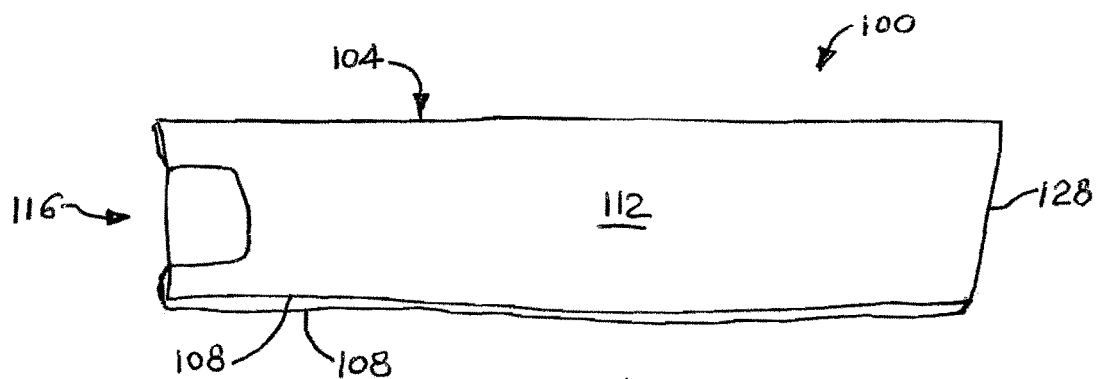
FIG. 1 is a plan view of a pad of dispensable tape segments, shown in a fully sealed initial condition.
Figure 4:
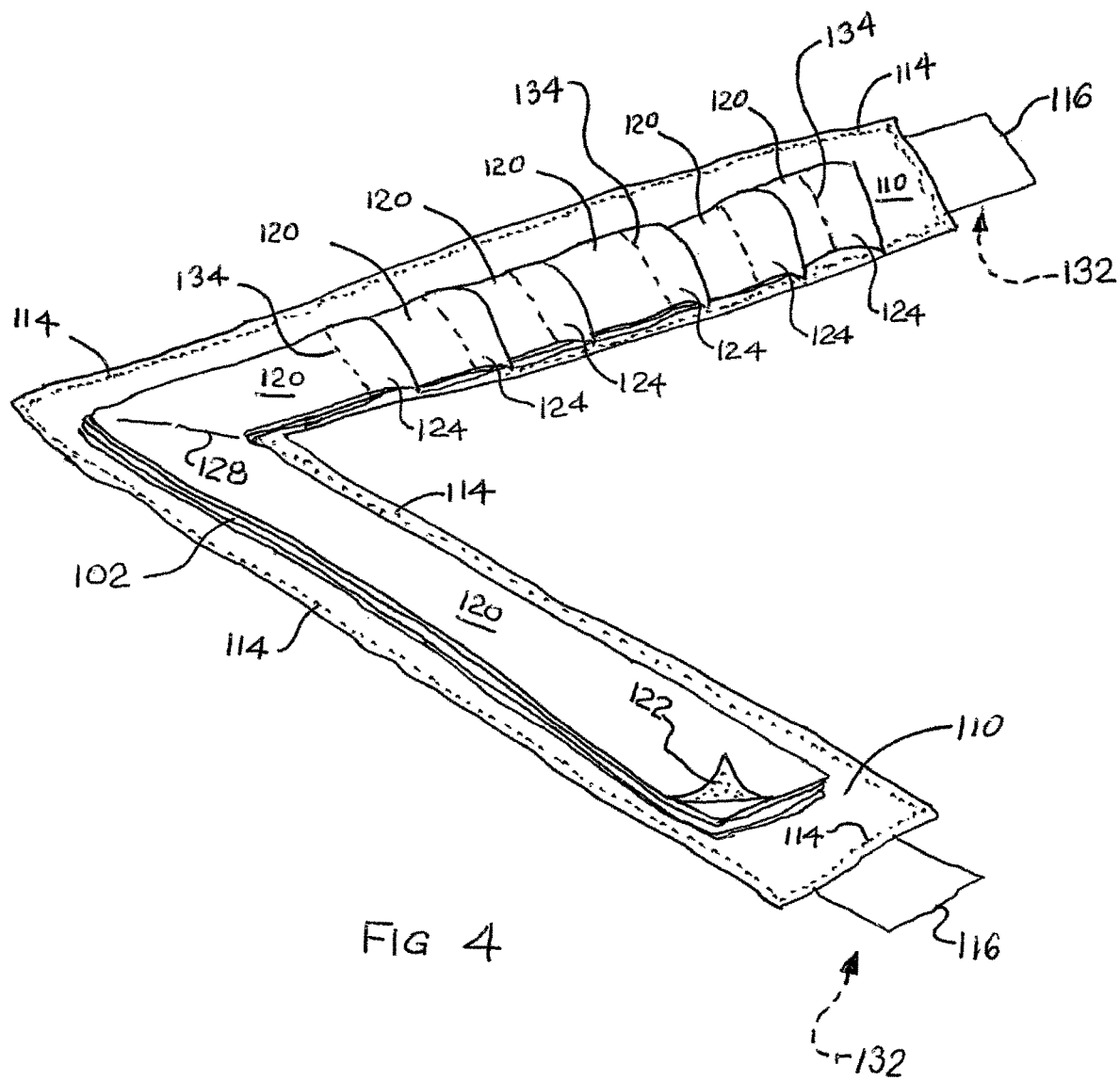
FIG. 4 is a perspective view of the pad of FIG. 3, shown partially folded.
Figure 2:
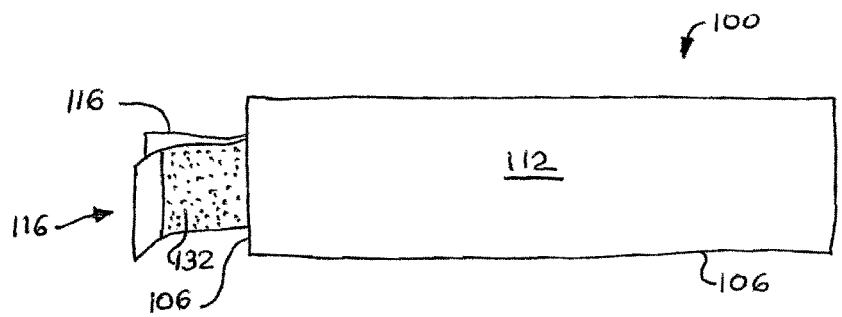
FIG. 2 is a plan view of a pad of dispensable tape segments, shown in an initial stage of opening.
Figure 3:
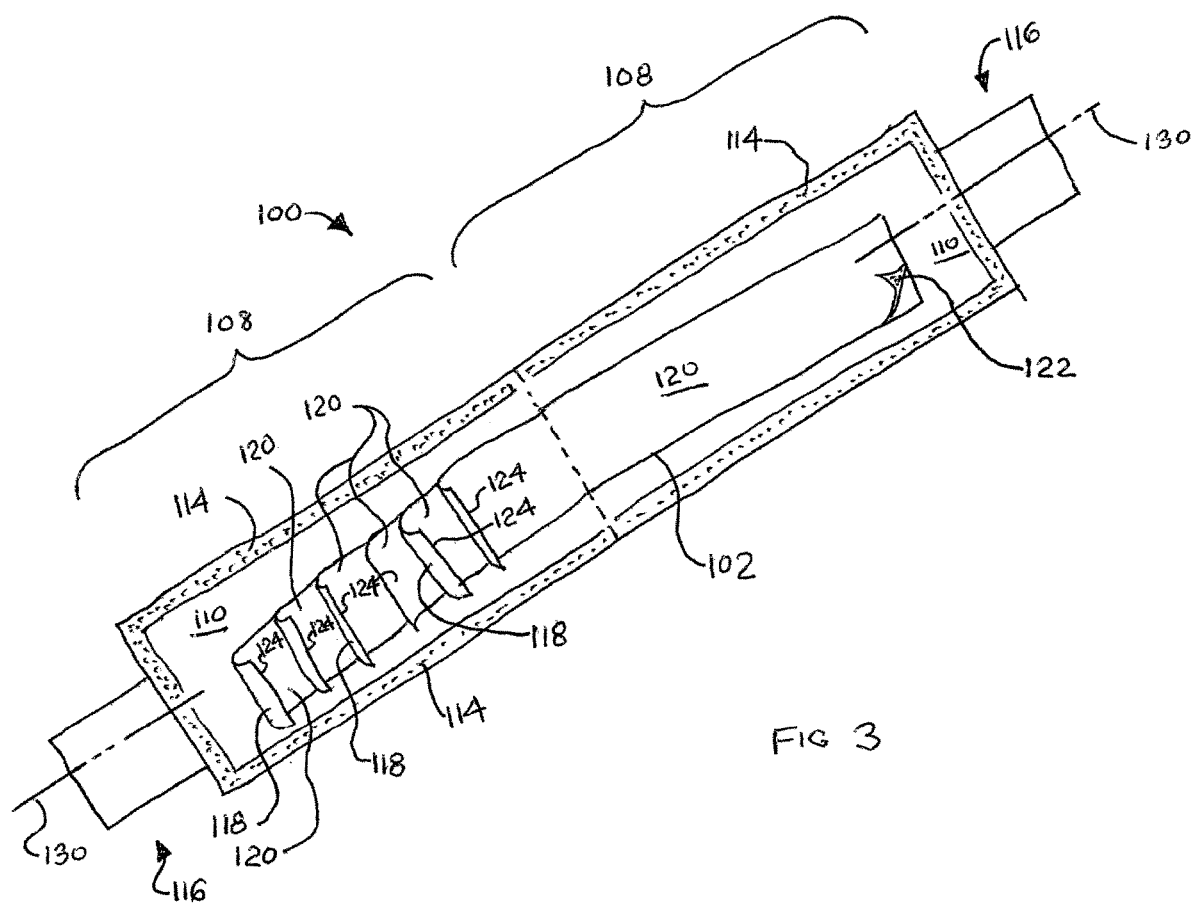
FIG. 3 is an exploded plan view of the pad of FIG. 2, shown opened and spread flat, and with one tape segment detached.

Referring first to FIGS. 1-4, according to at least one aspect of the invention, there is shown a pad 100 of dispensable tape segments 102 (FIGS. 3 and 4). Pad 100 of dispensable tape segments 102 may comprise a two-ply envelope 104 closed about a periphery 106 thereof to define a sealed interior between each of the two plies 108. Two-ply envelope 104 may have two interior faces 110 and two opposed exposed faces 112. At least one of the two interior faces 110 bears a first adhesive 114.

Pad 100 of dispensable tape segments 102 may further comprise at least one pull tab 116 projecting from two-ply envelope 104. A plurality of tape segments 102 may (each) have a first face 118 to be applied to an environmental surface (not shown) and an opposed second face 120 facing away from first face 118. First face 118 (FIG. 3) of each one of tape segments 102 may bear a second adhesive 122 such that first adhesive 114 of two-ply envelope 104 has greater adherence than an adherence of second adhesive 122 of tape segments 102. Each one of tape segments 102 may comprise a pull tab section 124 and a principal portion 126. Second adhesive 122 is on principal portion 126. It should be noted that pull tab sections 124 do not bear second adhesive 122. For this reason, pull tab sections 124 may curl as seen in FIG. 3, thereby being readily graspable.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

First adhesive 114 is on interior face 110 of envelope 104, and is on a limited zone at periphery 106 of two-ply envelope 104. The purpose of first adhesive 114 is to maintain two play envelope 104 closed and sterile.

Tape segments 102 overlie one another and are adhered at least to one other tape segment 102 or to two-ply envelope 104. Pull tab sections 124 of tape segments 102 are arrayed in a series along longitudinal axes 130 (see FIG. 3) of tape segments 102 and two-ply envelope 104. Two-ply envelope 104 has a longitudinal axis 130 (FIG. 3), and each tape segment 102 has a longitudinal axis 130 parallel to longitudinal axis 130 of two-ply envelope 104. Pull tab sections 124 are all exposed for grasp when two-ply envelope 104 is opened to expose tape segments 102. Of course, overlying is partial, so that pull tab sections 124 are serially arrayed as shown in FIGS. 3 and 4. It will be appreciated that longitudinal axes 130 may be parallel to one another and spaced apart. It is not necessary that tape segments 102 be centered on two-ply envelope 104. For the purposes of this disclosure, a pad is a plurality of individually separable members arranged in at least partially overlying relation.

Two-ply envelope 104 is two-ply in the initial condition of FIG. 1. The two plies 108 will be understood to refer to the web constituting two-ply envelope 104 and not to other components adhered or coupled to the web. When two-ply envelope 104 is spread flat (as in FIG. 3) or even partially spread from the initial condition of FIG. 1 (partial spreading is shown in FIG. 4), each of the two plies 108 is defined as being on one side of a first fold line 128. A similar situation regarding the number of faces exists for interior faces 110 and two opposed exposed faces 112. With two-ply envelope 104 spread flat, interior faces 110 would visually merge into one, as with exposed faces 112.

Exposure of first adhesive 132 of pull tabs 116 enables two-ply envelope 104 to be adhered to an environmental object such as for example a hospital bed, a table, the patient's body, and the body of the medical personnel (none of these examples is shown). Pad 100 can thereby be advantageously located with tape segments 102 exposed for ready retrieval. This greatly expedites application of tape for securing tubular conduits (not shown). Tape segments 102 can also be retrieved by one hand, while the other hand of the medical personnel remains free from having to secure pad 100 or be occupied for purposes of retrieving a tape segment 102.

Pull tabs 116 of two-ply envelope 104 may be replaced by an additional adhesive strip (not shown) applied along a substantial length of surface 112, and protected by a removable liner. The liner would be removed to reveal the additional adhesive strip to fasten pad 100 to an environmental surface.

In the embodiments of FIGS. 1-4, two-ply envelope 140 is rectangular and is created when plies 108 are folded over one another at fold line 128, and when periphery 106 is adhered by first adhesive 114 when pad 100 is manufactured. Of course, two-ply envelope 104 could take on other configurations if desired.

In pad 100, pull tab 116 of the two-ply envelope may be at a peripheral side opposite the fold joint (fold line 128), as seen in FIGS. 1-4. This facilitates spreading two-ply envelope 104 fully open, as seen in FIG. 3.

As seen in FIGS. 2-4, pull tab 116 of the two-ply envelope may be a first pull tab 116 coupled to one of two plies 108 (called out in FIG. 3). The pad of dispensable tape segments 102 may further comprise a second pull tab 116 coupled to the other one of the two plies 108.

Each tape segment 102 may further comprise a demarcation line 134 (FIG. 4) between pull tab section 124 and principal portion 126 of tape segment 102. This enables pull tab section 124 to be removed to avoid portions of tape segment projecting once the tape segment is attached to a desired surface. Optionally of course, pull tab section 124 may be left in place to facilitate easy removal of tape segment 102 from the desired surface, such as when tape segments 102 are removed from the patient.

Where pad 100 is intended for medical usages, dispensable tape segments 102 and the sealed interior of two-ply envelope 104 (in the initial condition seen in FIGS. 1 and 2) are sterile prior to opening two-ply envelope 104, and two-ply envelope 104 is waterproof, so that prior to opening.

In addition, when two-ply envelope 104 is adhered to an environmental surface, the waterproof nature of two-ply envelope 104 ensures that the dispensable tape segments 102 remain guarded from contaminants that may be found on the environmental surface.

Figure 5:
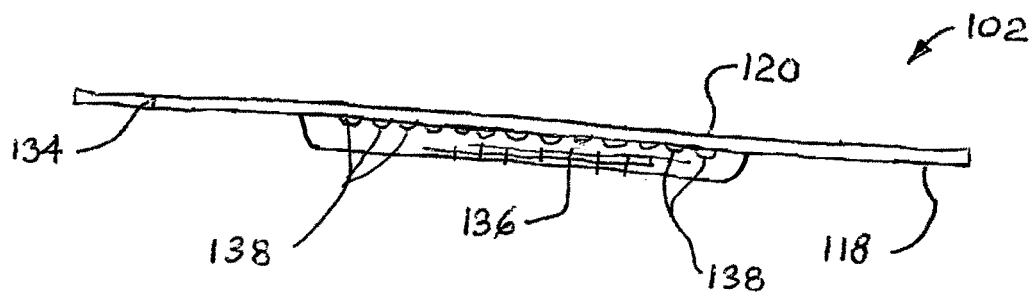
FIG. 5 is a side view of a dispensable tape segment, according to an embodiment.

In an option illustrated in FIG. 5, each first face 118 of each tape segment 102 may have a ribbed surface (represented as ribs 138) located about a central portion of tape segment 102. The ribbed surface allows the practitioner/technician or patient to increase the pressure on a given point on the patient which may be bleeding from a puncture wound from a shot, blood draw, or intravenous line. Ribs 138 also allow the patient to be aware of where pressure should be applied to help stop the bleeding because the ribbed surface can be felt from the opposed second face 120. An additional option would be to include bandage material 136 coupled either to the standard tape segment 102 or the taped segment 102 with the additional ribbed surface.

Figure 6:
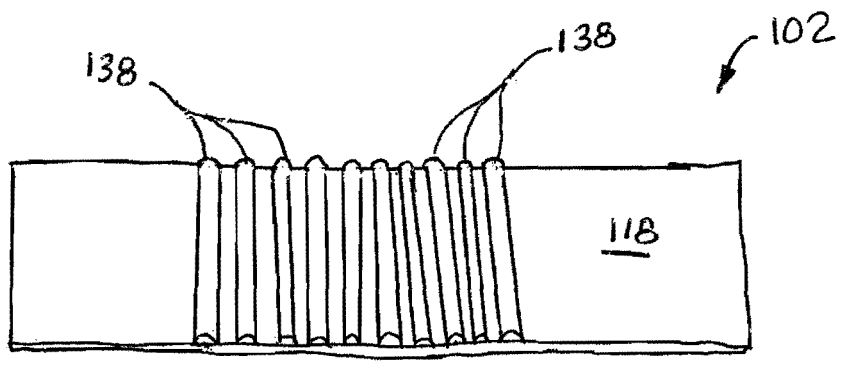
FIG. 6 is a perspective view of a dispensable tape segment, according to an embodiment lacking a gauze pad shown in FIG. 5.

FIG. 6 shows a variation of the embodiment of FIG. 5 wherein bandage material 136 is omitted. In this variation, bandage material 136 may be provided separately or may be pre-existing (e.g., previously applied to the patient). Bandage material 136 encompasses materials such as gauze, cloth fabric, cotton batting, etc. which may be used to protect open wounds, absorb exudates, to enable exposure of wound tissue to air, etc.

In the embodiment of FIG. 6, in pad 100, tape segments 102 may have ribs 138 between first face 118 of tape segment 102 and bandage material 136. In the embodiment of FIG. 6, tape segments 102 have ribs 138 on first face 118 of tape segment 102, but no bandage material 136.

It should be noted that a given pad 100 could have a combination of standard tape segments 102, tape segments 102 with a ribbed portion (as seen in FIG. 6), and tape segments 102 with a ribbed portion with bandage material 136 (as seen in FIG. 5). For example, it would be beneficial for a particular purpose if the only the first/uppermost tape segment 102 of pad 100 (the tape segment 102 most directly accessible once the two-ply envelope 104 is opened) included the ribbed portion or ribbed/bandage combination so that the first tape segment 102 can be best utilized to protect a bleeding wound. Thereafter, standard tape segments 102 would follow in the same pad 100 for securing other items that are needed for the patient, such as tubing, needles, vials, etc.

Figure 7:
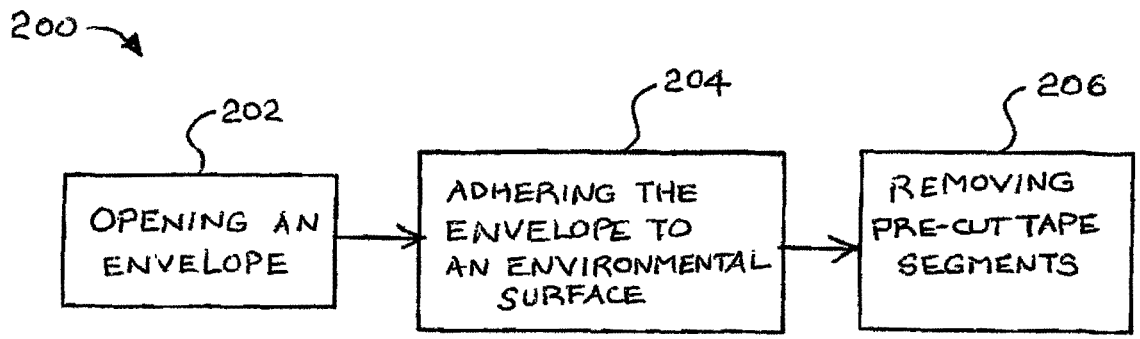
FIG. 7 is a block diagram summarizing steps of utilizing any of the pads of FIGS. 1-5.

Apart from convenience of providing pre-cut strips of attaching tape and pre-formed bandage type devices, pad 100 facilitates and promotes expeditious securement of tubular conduits on a patient or to merely assist in wound protection. Therefore, and with reference to FIG. 7, the invention may also be viewed as a method 200 of utilizing pre-cut tape segments (e.g., tape segments 102) provided in an enclosed pad (e.g. pad 100). The method may comprise a step 202 of opening an envelope (e.g. two-ply envelope 104) of the enclosed pad by pulling an adhesive tab (e.g., pull tab 116) on the envelope, to expose the pre-cut tape segments; a step 204 of adhering the envelope to an environmental surface using exposed adhesive (e.g., first adhesive 114 or third adhesive 132 of pull tab 116, or both) of the envelope; and a step 206 of using only one hand, removing pre-cut tape segments individually from the pad while not touching the pad with the other hand. To allow for the simple potential one-handed use of pad 100, third adhesive 132 that is used to mount the two-ply envelope 104 to the environmental surface is tackier (i.e., has greater gripping power) than second adhesive 122 used on the pre-cut tape segments 102, such that a user (e.g., a technician, nurse, or doctor) can remove an individual or multiple tape segments 102 from pad 102 while two-ply envelope 104 remains in place/adhered upon the environmental surface.

The present invention is susceptible to modifications and variations which may be introduced thereto without departing from the inventive concepts. For example, the invention lends itself to non-medical uses, as novelty lies in advantages of expeditious application of adhesive web rather than inherently being medical in nature.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A pad of dispensable tape segments, comprising:
   a two-ply envelope closed about a periphery thereof to define a sealed interior between each of the two plies, the two-ply envelope having two interior faces and two opposed exposed faces, wherein at least one of the two interior faces bears a first adhesive;
   at least one pull tab projecting from the two-ply envelope;
   a plurality of tape segments having a first face to be applied to an environmental surface and an opposed second face facing away from the first face, wherein
      the first face of each one of the tape segments bears a second adhesive such that the first adhesive of the two-ply envelope has greater adherence than an adherence of the second adhesive of the tape segments,
      each one of the tape segments comprises a pull tab section and a principal portion, and the second adhesive is on at least the principal portion,
      the tape segments overlie one another and are adhered at least to one other said tape segment or to the two-ply envelope, and
      the pull tab sections of the tape segments are all exposed for grasp when the two-ply envelope is opened to expose the tape segments.

2. The pad of dispensable tape segments of claim 1, wherein the two-ply envelope has a longitudinal axis, and each said tape segment has a longitudinal axis parallel to the longitudinal axis of the two-ply envelope.

3. The pad of dispensable tape segments of claim 2, wherein the pull tab sections of the tape segments are arrayed in a series along the longitudinal axes of the tape segments and the two-ply envelope.

4. The pad of dispensable tape segments of claim 1, wherein the two-ply envelope is rectangular and folded over itself to define four peripheral sides such that one of the four peripheral sides is a fold joint and three others of the four peripheral sides are unjoined where one of the two plies meets the other of the two plies in overlying relation.

5. The pad of dispensable tape segments of claim 4, wherein the pull tab of the two-ply envelope is at a peripheral side opposite the fold joint.

6. The pad of dispensable tape segments of claim 5, wherein the pull tab of the two-ply envelope is a first pull tab coupled to one of the two plies, and the pad of dispensable tape segments further comprises a second pull tab coupled to the other one of the two plies.

7. The pad of dispensable tape segments of claim 1, wherein each said tape segment further comprises a demarcation line between the pull tab section and the principal portion.

8. The pad of dispensable tape segments of claim 1, wherein
   the dispensable tape segments and the sealed interior of the two-ply envelope are sterile prior to opening the two-ply envelope, and
   the two-ply envelope is waterproof, so that prior to opening, the dispensable tape segments remain sterile.

9. The pad of dispensable tape segments of claim 1, wherein the second adhesive of the tape segments is on only the principal portion.

10. The pad of dispensable tape segments of claim 1, wherein the first adhesive of the two interior faces of the two-ply envelope covers a portion of the interior face greater in area than an area covered by the dispensable tab segments, such that the first adhesive may be employed to adhere the two-ply envelope to an environmental surface.

11. The pad of dispensable tape segments of claim 1, wherein each said first face of each said tape segment has bandage material coupled thereto.

12. The pad of dispensable tape segments of claim 11, wherein said tape segments have ribs between a face of said tape segment and the bandage material.

13. The pad of dispensable tape segments of claim 1, wherein said tape segments have ribs on one face of said tape segment.

* * * * *